No. 859,788. PATENTED JULY 9, 1907.
C. THIBODEAU.
CANDY PULLING MACHINE.
APPLICATION FILED AUG. 3, 1901.
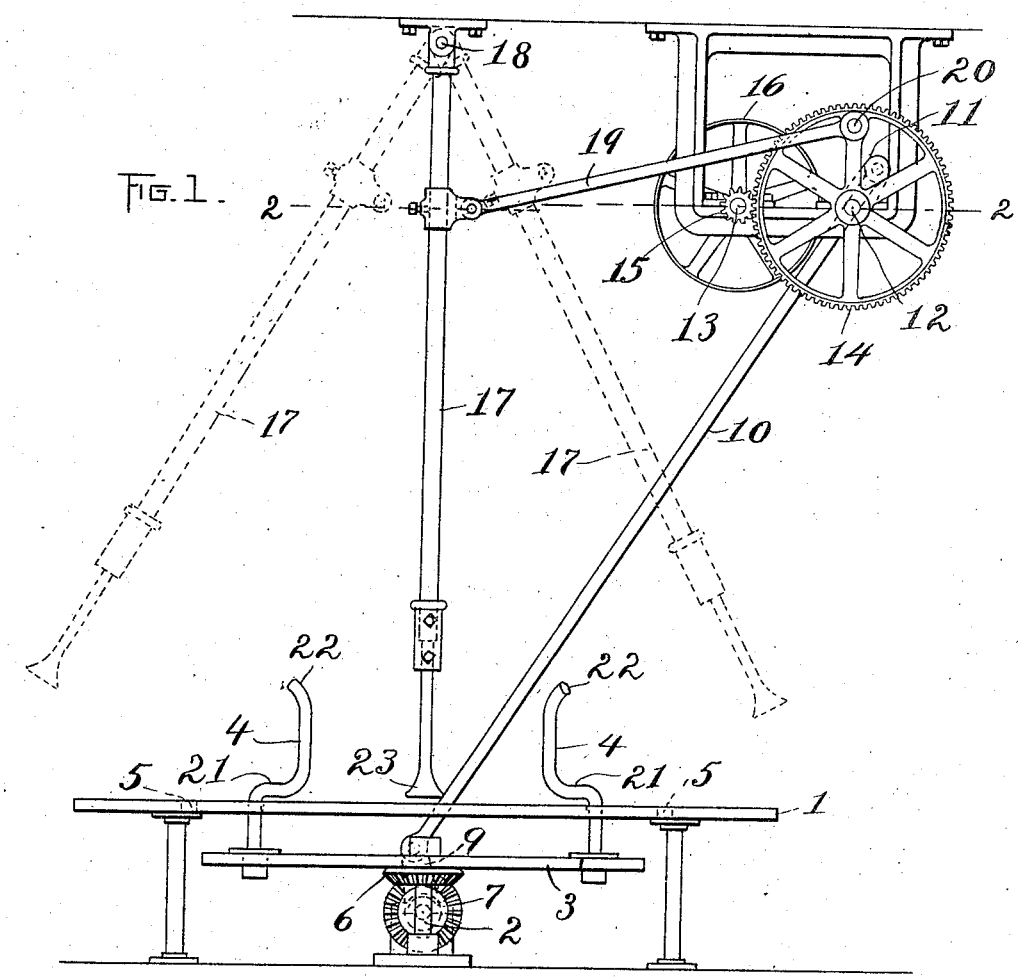
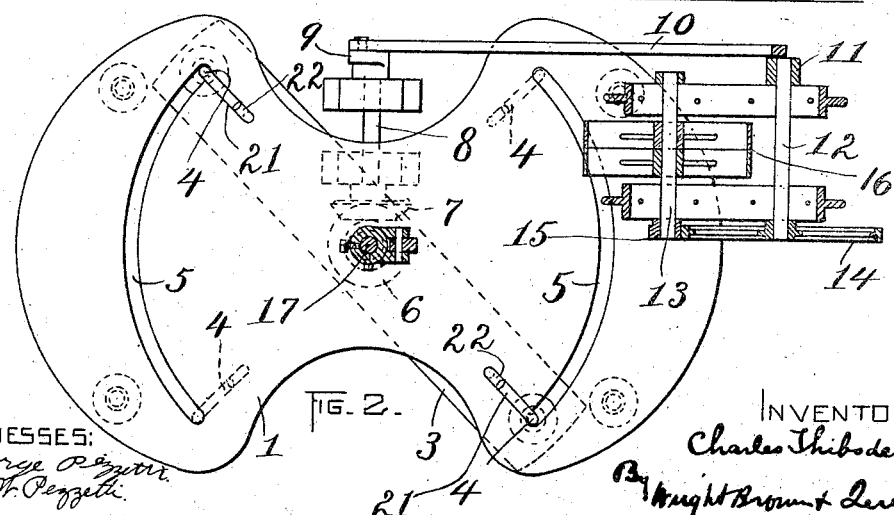
WITNESSES:
INVENTOR:
Charles Thibodeau
By Wright Brown & Quinby
Attys.

UNITED STATES PATENT OFFICE.

CHARLES THIBODEAU, OF SOMERVILLE, MASSACHUSETTS, ASSIGNOR, BY MESNE ASSIGNMENTS, TO EDWARD A. KITZMILLER, OF PITTSBURG, PENNSYLVANIA, AND ROBERT P. DUFF, OF SWISSVALE BOROUGH, PENNSYLVANIA, TRADING UNDER FIRM-NAME OF P. DUFF & SONS, OF PITTSBURG, PENNSYLVANIA.

CANDY-PULLING MACHINE.

No. 859,788.      Specification of Letters Patent.      Patented July 9, 1907.

Application filed August 3, 1901. Serial No. 70,832.

*To all whom it may concern:*

Be it known that I, CHARLES THIBODEAU, of Somerville, in the county of Middlesex and State of Massachusetts, have invented certain new and useful Improvements in Candy-Pulling Machines, of which the following is a specification.

This invention relates to machines for pulling candy and it consists in certain novel features of construction hereinafter described in the specification, illustrated in the drawings, and pointed out in the claims.

Of the accompanying drawings, which show an embodiment of my invention selected by me for the purpose of illustrating the invention,—Figure 1 represents a side elevation of a candy-pulling machine constructed in accordance with my invention. Fig. 2 represents a horizontal section on the line 2—2 of Fig. 1.

The same reference characters indicate the same parts in all the figures.

In the drawings,—1 represents a table, below which, on a vertical shaft or pivot 2, is journaled an oscillating arm 3 having at its two ends two upwardly-projecting hook-shaped candy pegs or hooks 4 4 which project through segmental slots 5 5 in the table 1. The arm 3 is oscillated by mechanism including a bevel-gear 6 on the arm meshing with a bevel-gear 7 on a horizontal shaft 8 which has a crank 9 on its outer end. The crank 9 is connected by a link 10 with a shorter revolving crank 11 on a shaft 12 which is rotated by connection with a shaft 13 through a gear 14 on shaft 12 and an intermeshing gear 15 on shaft 13, said shaft 13 having a belt-pulley 16.

17 is a puller consisting of an arm pivoted to swing in a vertical plane on a pivot 18 and oscillated in synchronism with the candy-pegs by connection through a link 19 with a wrist pin 20 on the side of the gear 14.

The lower end of the puller 17 moves in a path which extends between the candy-hooks 4 4 and beyond or outside thereof in both directions. The candy is fastened in the form of a hank upon the hooks and extends across between them, so that as the puller 17 moves across the line connecting the hooks, it engages the hank at the middle thereof and elongates it or pulls it out. The oscillatory movement of the arm 3 causes the hooks 4 4 to reciprocate in opposite directions from the full-line positions to the dotted-line positions shown in Fig. 2 and vice versa. The movement of the puller across the line connecting the hooks occurs when the hooks are substantially at rest in their extreme positions as represented in Fig. 2, and when the puller is at the extreme end of its movement outside of the hooks, as represented by either of the dotted-line positions in Fig. 1, the hooks are shifting their positions from one extreme to the other. As the puller moves out from its middle position to its extreme position the hank of candy is stretched out as previously stated and is wrapped in strands around the nearest hook by the shifting movement of said hook. As the puller then moves back to and past its middle position in the opposite direction it crosses the line connecting the hooks, from the opposite side, and in so doing it first lays the pulled-out loop of candy back on the hank and then pulls out the hank in the opposite direction. The strands are then wound around the opposite hook and laid back on the hank, which operation completes a cycle. The cycles are repeated until the candy is sufficiently pulled. As to the relative movement of the candy-hooks or pegs and the puller, it is characteristic of my machine that the entire position-shifting movement is given to the pegs and the entire pulling movement to the puller.

The hooks or pegs 4 4 are provided with lower portions 21—21 directed toward each other or converging in the direction of the line of pull of the candy to prevent the candy from falling down the hooks, and with free end portions 22 22 directed away from each other to prevent the candy from being drawn upwardly off the hooks by the action of the puller. The puller 17 is provided with a flaring or spreading lower end portion 23 to prevent the candy from slipping down off the puller.

I claim:—

1. In a candy pulling machine, moving members and oppositely disposed candy pegs thereon, said parts being arranged to cause the candy to work away from the ends of the said pegs during the pulling operation.

2. In a candy pulling machine, oppositely disposed candy pegs having the sides thereof converging in the direction of the line of pull of the candy.

3. In a candy-pulling machine, a pair of oppositely-directed, hook-shaped candy pegs having lower portions directed toward each other and upper free ends directed away from each other, to retain the candy on the pegs.

In testimony whereof I have affixed my signature, in presence of two witnesses.

CHARLES THIBODEAU.

Witnesses:
  GEORGE PEZZETTI,
  P. W. PEZZETTI.